Feb. 17, 1970 HIROSHI ITO 3,495,708
APPARATUS FOR AUTOMATICALLY SORTING SPHERICAL
AND CYLINDRICAL ARTICLES
Filed Sept. 20, 1967
3 Sheets-Sheet 1

INVENTOR.
Hiroshi Ito
BY
Attorneys

Feb. 17, 1970    HIROSHI ITO    3,495,708
APPARATUS FOR AUTOMATICALLY SORTING SPHERICAL
AND CYLINDRICAL ARTICLES
Filed Sept. 20, 1967    3 Sheets-Sheet 2

United States Patent Office 3,495,708
Patented Feb. 17, 1970

3,495,708
APPARATUS FOR AUTOMATICALLY SORTING SPHERICAL AND CYLINDRICAL ARTICLES
Hiroshi Ito, Hamamatsu-shi, Japan, assignor to Kabushiki Kaisha Maruhiro Giken Seisakusho, Hamamatsu-shi, Shizuoka-ken, Japan, a joint-stock company of Japan
Filed Sept. 20, 1967, Ser. No. 669,028
Claims priority, application Japan, May 20, 1967, 42/31,975
Int. Cl. B07b 13/06; B07c 1/10, 5/06
U.S. Cl. 209—92                                1 Claim

ABSTRACT OF THE DISCLOSURE

One or more flap-like support members are pivotally supported on a conveyor device to form a limiting aperture of variable size and holds an article to be sorted until the aperture, which is progressively widened by the cam action of a guide rail as the conveyor device travels, is of a specific size permitting the article to drop into a chute positioned for collecting articles of that specific size.

---

This invention relates to classifying or sorting apparatuses and more particularly to a new apparatus for automatically sorting spherical and cylindrical articles, which is particularly suitable for sorting agricultural products.

An object of the present invention is to provide an automatic apparatus for sorting spherical and cylindrical articles which fulfills the requirements of high sorting accuracy, no possibility of damage to the sorted articles, simple construction and operation, freedom from malfunctioning, and ease and convenience in handling and maintenance.

According to the present invention, briefly summarized, there is provided an apparatus for automatically sorting substantially spherical and cylindrical articles characterized by the combination of an endless conveyor device, a guide rail structure disposed parallel to the conveyor device and having a guide surface of stepped graduated height, at least one sorter unit conveyed by the conveyor device and having at least one support member for holding and dropping one of the articles, which support member is hinged at one end and forms at its free end a limiting aperture of variable size for passage of the article, and actuating means following the guide surface of the guide rail structure and operating to vary the size of the aperture in accordance with the height of the guide surface.

The nature, principle, details, and utility of the invention will be more clearly apparent from the following detailed description with respect to preferred embodiments of the invention when read in conjunction with the accompanying drawings, in which like parts are designated by like reference numerals and characters.

Figure 5:
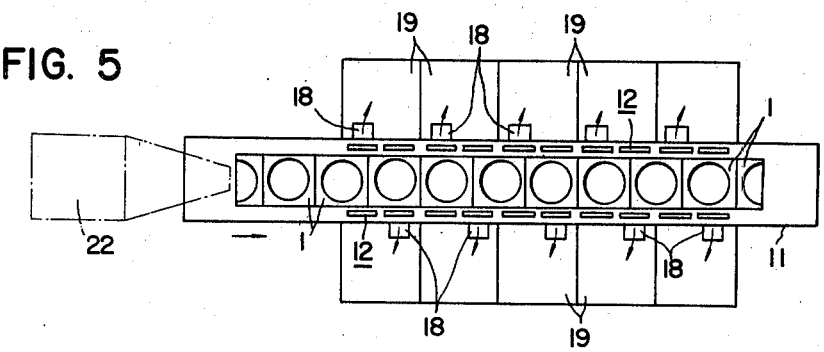
Figure 6:
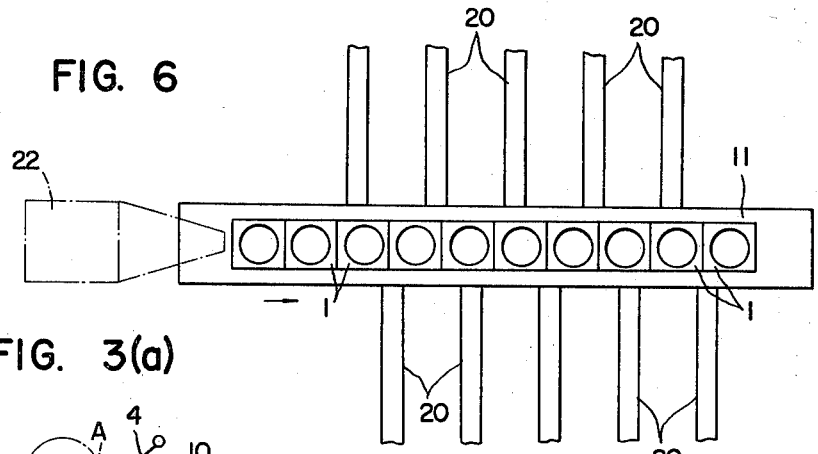
Figure 3A:
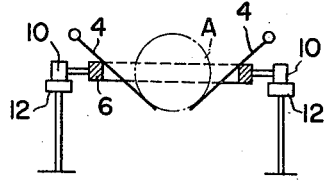
Figure 3B:
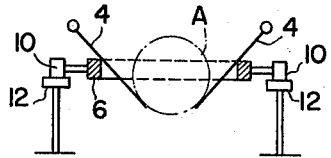
Figure 3C:
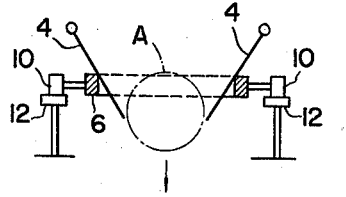
Figure 4:
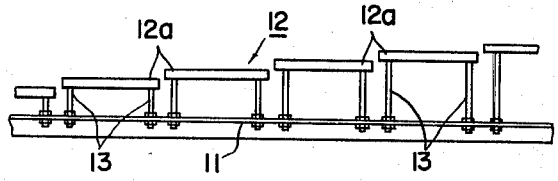
Figure 7:
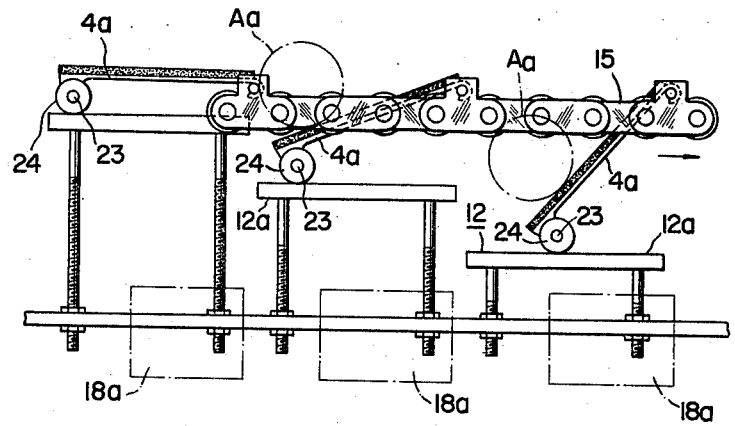
Figure 8:
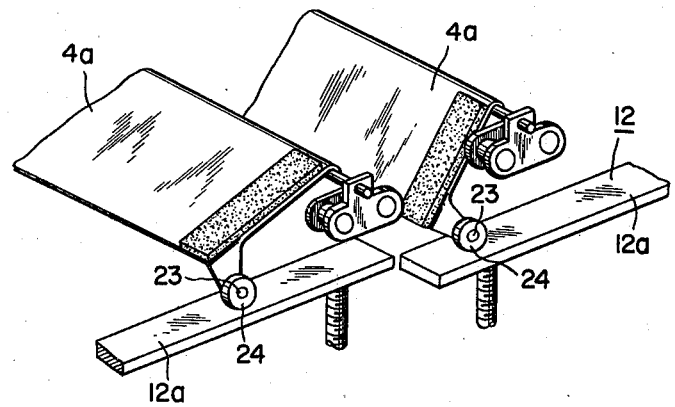

FIGS. 3a, 3b, and 3c are diagrammatic elevational views indicating operational states of the sorter unit;

FIG. 4 is a diagrammatic elevational view showing the arrangement of guide rails in the sorting apparatus of the invention;

FIG. 5 is a diagrammatic plan view showing the general organization of one example of a sorting apparatus according to the invention;

FIG. 6 is a diagrammatic plan view showing the general organization of another example of a sorting apparatus embodying the invention;

FIG. 7 is a diagrammatic side elevational view showing the essential organization of parts of a modification of the sorting apparatus of the invention for sorting cylindrical articles; and FIG. 8 is a perspective view showing the construction of the sorting apparatus, particularly, the connection between the gauge plate and the chain conveyor.

In one embodiment of the invention as illustrated in FIGS. 1 through 5 for sorting of substantially spherical articles, there are provided a plurality of sorter units 1 each provided with a horizontal base platform 2 having a drop hole 3 in the central part thereof. Below the base platform and around the periphery of this drop hole 3, there is provided a funnel-shaped assembly of tongue-like support blades 4 which are hinged at their upper edges by hinges 5 to the lower surface of the base platform 2 near the periphery of the drop hole 3.

Each of the support blades 4 has a quadrilateral shape in planar view tapering from maximum width at its upper hinged edge to minimum width at its lower free end and has a slight arcuate camber in cross section which is concave on the surface facing the center of the assembly of support blades. The support blades 4 are angularly positioned in a downwardly converging state by a horizontally supported ring 6 contacting the outer surfaces of the support blades and having an inner diameter less than that of the circle to which the hinge lines of the support blades are tangent. The support blades 4 thus define a funnel-shaped structure with an approximately circular aperture at the bottom.

Vertical sliding rods 7 are fixed at their upper ends to the outer side of the ring 6 on respectively opposite sides thereof and are slidably inserted at their lower ends in corresponding guide cylinders 8 supported in a suspended manner by brackets fixed to the lower surface of the base platform 2 near the periphery of the drop hole 3. The ring 6 is thereby guided in vertical movement.

On diametrically opposite sides of the ring 6 and at points on the diameter thereof in the transverse direction of the apparatus, brackets 9 are fixed to the outside surface of the ring 6 and carry rotatable support rollers 10 which project outward from the ring 6 and have a horizontal axis of rotation. The rollers 10 are adapted to roll freely along respective guide rails 12 disposed parallel to the longitudinal direction of the apparatus and fixed to parts of the apparatus frame 11.

Thus, the vertical position of the ring 6 is determined by the height of the guide rails 12, whereby the size of the bottom aperture of the funnel formed by the support blades 4 is determined. Upward and downward movements of the ring 6 respectively cause closing and opening movements of the support blades 4 as hereinafter described more fully. When the ring 6 is at its highest position, the support blades are closed to provide the minimum degree of opening of the funnel bottom aperture. On the other hand, when the ring 6 is at its lowest position, at which it is in contact with the outer surfaces of the support blades 4 near their lower ends, the support blades 4 are opened to provide the maximum opening of the funnel bottom aperture.

Each of the guide rails 12 is made up of a series of unit guide rails 12a aligned in a single row and having successively graduated heights. The number and heights of these unit guide rails 12a correspond respectively to the number of desired size classifications and to the size limits of these classifications as determined by the vertical positions of the ring 6 and the degree of opening of the funnel bottom aperture.

Each unit guide rail 12a is fixedly mounted on the upper ends of two vertical columns 13 having threaded lower ends which are passed through a part of the apparatus frame 11 and secured in position by nuts 14. When it is not necessary to adjust the heights of the unit guide rails 12a, a single long rail material may be bent and formed into a stepped member instead of using separate unit guide rails in stepped arrangement.

Each of the aforementioned sorter units 1 is conveyed on an endless conveyor device, which in the illustrated example is a pair of parallel roller chains 15 having a horizontal operational span. The sorter units 1 are mounted consecutively in a row between the roller chains 15 on respective brackets 16 connected to and projecting inward from the roller chains 15. The roller chains 15 travel on and are guided by roller chain rails 17, being driven by a suitable motive power means (not shown).

Figure 1:
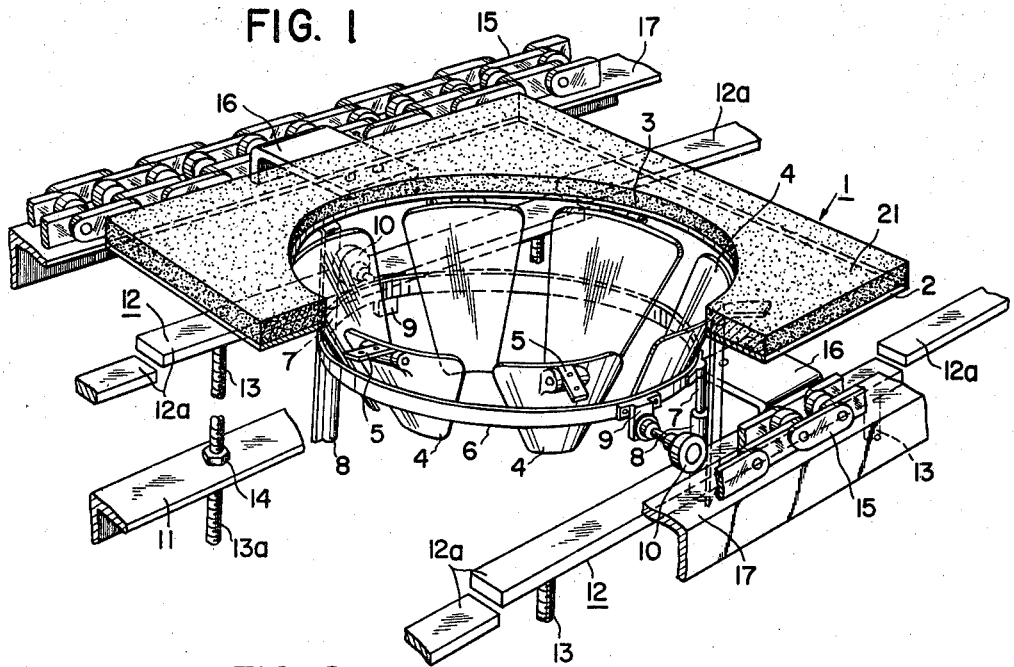
FIG. 1 is a perspective view, with parts cut away, showing the essential organization of one sorter unit for spherical articles of an example of a sorting apparatus according to the invention.
Figure 2:
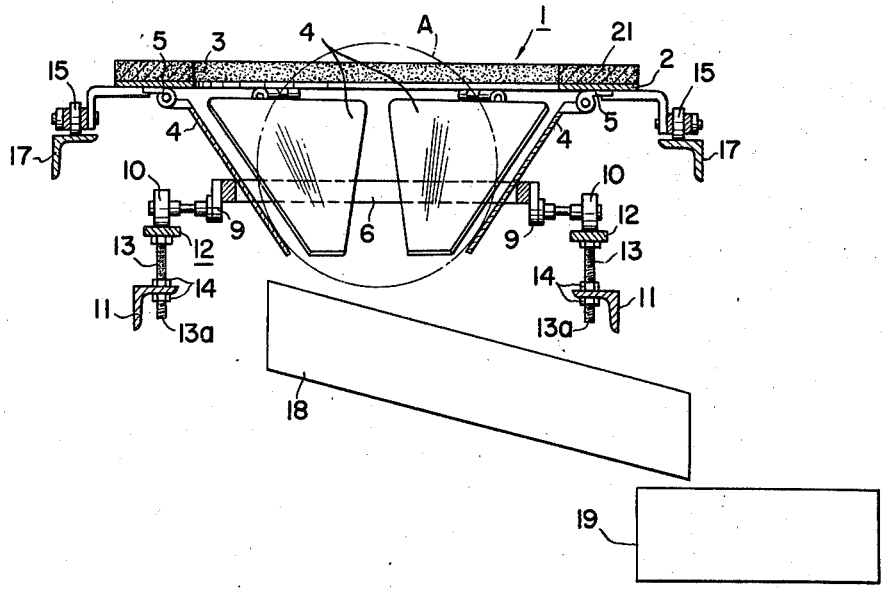
FIG. 2 is an elevational view, in vertical section, of the sorter unit shown in FIG. 1.

For each unit pair of guide rails 12a and in a position to confront from below a sorter unit 1 passing over the unit guide rails 12a, there is provided a chute 18 to receive articles dropped from the sorter unit 1. The chutes 18 along the process line of the apparatus are alternately arranged to direct the articles received respectively to left and right buckets or bins 19 as shown in FIGS. 2 and 5. These bins 19 may be replaced by conveyors 20 in some cases as indicated in FIG. 6.

The upper surface of each of the aforedescribed base platforms 2 is covered with a shock absorbing material 21 such as urethane foam to thereby lessen the impact to which each article A to be sorted is subjected as it is fed onto the base platform from a feeding device 22. Furthermore, in the case where the articles to be sorted are easily damaged, as in the case of peaches, they can be further protected by electrostatic flock-coating of the inner surfaces of the support blades 4.

In another embodiment of the invention as illustrated in FIG. 7, the apparatus is adapted to sort articles of cylindrical shape. In this case, the sorter units respectively comprise rectangular support plates 4a swingably connected at equally spaced intervals to the inner sides of a pair of parallel endless conveyors, such as chains 15, movably supported on respectively opposite lateral sides of the apparatus frame and driven by suitable means (not shown). Each support plate 4a is disposed between the two endless conveyors 15 and pivotally connected at two corners at one end thereof to the two chains 15 and is thereby hinged about a horizontal, transverse axis through the two pivot points.

A transverse shaft 23 is fixed along the edge of the free end of each support plate 4a and rotatably supports rollers 24 at its two ends for rolling on guide rails 12 in stepped arrangement as in the aforedescribed example.

The spacing of the points at which the support plates 4a are connected to the endless conveyors in the longitudinal direction is selected in appropriate conformance with the diameter of the article to be sorted. When the rollers 24 at the free end of a support plate 4a are engaged with the unit guide rails 12a of maximum height, the support plate 4a assumes a substantially horizontal state whereby the sorter unit has the minimum degree of opening of its aperture for passage of an article to be sorted. When the rollers 24 are engaged with the unit guide rails 12a of minimum height, the sorter unit has the maximum degree of opening of its aperture.

Chutes 18a respectively for the unit guide rails 12a are disposed to guide articles dropped from the support plates 4a alternately to left and right buckets or conveyors as in the aforedescribed example. As in the previous example, measures such as electrostatic flock-coating may be applied to the upper surfaces of the support plates 4a to absorb impact which would otherwise be imparted to the articles being sorted and thereby to prevent damage to these articles.

The sorting apparatus of the above described organizations according to the invention operates in the following manner.

In the case where substantially spherical articles are to be sorted, the apparatus in the form illustrated in FIGS. 1, 2, 3, and 5 or 6 is used. As the spherical articles A are fed from the supply section 22, each article A drops into the drop hole 3 of one of the sorter units 1, which are traveling together with the roller chains 15.

The rollers 10 rotatably fixed to the ring 6 of each sorter unit 1 thus receiving an article A are initially rolling on the highest unit guide rails 12a. Accordingly, the ring 6 of this sorter unit 1 is at its highest position, and the lower tips of the support blades 4 are in the state of minimum degree of opening of the aperture, whereby the article A will be held if it is larger than the aperture.

Then, as this sorter unit 1 is conveyed further down the line, and the rollers 10 move onto the succeeding unit guide rails 12a of the next lower level, the ring 6 descends through a distance equal to the distance through which the rollers 10 have dropped, and the support blades 4 are spread by their own weight and the weight of the article A, whereby the tips of the support blades 4 are opened to the succeeding classification size limit.

In this manner, as the sorter unit 1 is conveyed over successively lower unit guide rails 12a, the aperture formed by the tips of the support blades 4 becomes progressively wider until it permits the article A to pass, whereupon the article A drops into the chute 18 disposed therebelow at that instant and is guided to the corresponding bucket 19 or conveyor 20. Thus, each article A is selectively guided to a group of articles of the same size as that article, whereby sorting or classification of the articles A according to a predetermined gradation of sizes is accomplished.

In the case where the articles to be sorted are of cylindrical shape, the apparatus of the invention in the form illustrated in FIG. 7 is used. The articles Aa to be sorted are fed onto the support plates 4a which are being conveyed by the endless chains 15. The rollers 24 at the free end of each support plate 4a are initially rolling on the highest unit guide rails 12a at the position where that support plate receives an article Aa.

As this support plate 4a is conveyed further down the line, and the rollers 24 are transferred onto successively lower unit guide rails 12a, the support plate 4a progressively swings further downward to widen its aperture for permitting passage of the article Aa until the aperture size becomes greater than the diameter of the article Aa. The article Aa thereupon passes through the aperture and drops into the chute 18a at that point of the line to be guided to a bucket or conveyor as in the aforedescribed case.

Thus, the support blades 4 and support plates 4a in the above described two forms of the apparatus of the invention are caused to widen their apertures progressively in accordance with the predetermined heights of the guide rails 12a as they are conveyed down the line, whereby the articles A and Aa are sorted by size.

In the sorting of spherical and cylindrical objects according to the present invention as described above, it is possible to attain a high degree of sorting accuracy since the degrees of opening of the limiting apertures formed by the support blades 4 and support plates 4a are accurately determined by the predetermined heights of the unit guide rails 12a. Moreover, since the opening operation of the support blades and support plates and guiding of the dropped articles are accomplished entirely by the force of gravity, the construction of the apparatus can be substantially simplified and made to operate accurately and reliably without malfunctioning, and handling and maintenance of the apparatus are facilitated and made convenient.

Furthermore, since the degree of opening of the limiting apertures is determined by the height of the unit guide rails 12a, sorting in accordance with any desired gradation of sizes can be accomplished by providing unit guide rails with adjustable heights. Thus, the apparatus of the invention is applicable to the sorting of not only agricultural products but also of a wide range of other articles.

What I claim is:

1. An apparatus for automatically sorting substantially spherical and cylindrical articles, comprising, in combination: an endless conveyor device driven by motive power means to travel in a horizontal path; a guide rail structure disposed parallel to said path and having a guide surface of graduated stepped height portions decreasing in the direction of travel of said conveyor device; a plurality of sorter units, each comprising a horizontal base platform supported by said conveyor device so as to be transferred therewith and having a central drop hole and a plurality of support members each of which has a form of tongue-like blade, said members being arranged around and below said drop hole and each of said members being hinged at its upper edge to the lower surface of said base platform, extending around the periphery of said drop hole and converging toward its lower free edge so that collectively said members form a funnel-shaped structure with a lower aperture; a ring positioned to contact the outer surface of said support members of each sorter unit and provided with rollers which are positioned to roll along said guide surface of said guide rail structure, whereby said ring is lowered during the travel of each sorter unit to which said ring is provided, thus causing an increase in the opening of said lower aperture formed by said support members of each said sorter unit; and chutes disposed below said sorter units at linear spacings along said horizontal path determined by each said stepped height portion of said guide rail structure to receive a specific size article which has been thus sorted.

References Cited

UNITED STATES PATENTS

| 944,887 | 12/1909 | Lomas | 209—84 |
| 3,019,898 | 2/1962 | Bertinot | 209—102 |
| 3,206,024 | 9/1965 | Blake | 209—84 |

FOREIGN PATENTS

| 1,045,414 | 10/1966 | Great Britain. |

RICHARD A. SCHACHER, Primary Examiner

U.S. Cl. X.R.

209—102